(12) United States Patent
Lalibertéet al.

(10) Patent No.: US 6,669,257 B2
(45) Date of Patent: Dec. 30, 2003

(54) POWER SWITCHING MECHANISM FOR ROBOTIC APPLICATIONS

(75) Inventors: Thierry Laliberté, Loretteville (CA); Clément Gosselin, Sillery (CA)

(73) Assignee: Université Laval, Québec (CA)

( * ) Notice: Subject to any disclaimer, the term of this patent is extended or adjusted under 35 U.S.C. 154(b) by 0 days.

(21) Appl. No.: 10/046,229

(22) Filed: Jan. 16, 2002

(65) Prior Publication Data

US 2002/0060465 A1 May 23, 2002

Related U.S. Application Data

(63) Continuation-in-part of application No. 09/579,493, filed on May 30, 2000, now Pat. No. 6,505,870.

(51) Int. Cl.$^7$ ................................................. B66C 1/00
(52) U.S. Cl. ........................... 294/106; 901/31; 192/34; 192/48.91
(58) Field of Search ............................... 192/34, 69.91, 192/48.9, 48.91; 294/106, 111, 115, 907, 88; 901/31–36, 39, 46; 414/618

(56) References Cited

U.S. PATENT DOCUMENTS

| | | | | |
|---|---|---|---|---|
| 943,142 A | * | 12/1909 | De Leeuw ................ 192/48.9 |
| 1,605,780 A | * | 11/1926 | Ristau, Jr. ................ 192/53.5 |
| 2,501,386 A | * | 3/1950 | Gibbs ......................... 81/476 |
| 2,684,142 A | * | 7/1954 | Willyard et al. ........ 192/69.61 |
| 2,699,682 A | * | 1/1955 | Castner ........................ 74/70 |
| 2,826,056 A | * | 3/1958 | Bruckman ................. 68/23.7 |
| 2,841,261 A | * | 7/1958 | Abrams .................... 192/66.23 |
| 2,927,168 A | * | 3/1960 | Brown ........................ 200/18 |
| 3,157,258 A | * | 11/1964 | Cronholm ................. 192/48.5 |
| 3,178,955 A | * | 4/1965 | Enders et al. ............... 74/369 |
| 3,688,885 A | * | 9/1972 | Cummings .................. 192/95 |
| 3,834,464 A | * | 9/1974 | Carlson et al. ............. 172/22 |
| 3,901,547 A | | 8/1975 | Skinner |
| 4,532,817 A | * | 8/1985 | Chaki ....................... 74/10.33 |
| 4,569,427 A | * | 2/1986 | F'Geppert ................ 192/69.91 |
| 4,623,183 A | * | 11/1986 | Aomori .................... 294/86.4 |
| 4,875,516 A | * | 10/1989 | Marocco .............. 160/178.1 R |
| 4,980,626 A | * | 12/1990 | Hess et al. ............. 318/568.16 |
| 5,108,140 A | | 4/1992 | Bartholet |
| 5,280,981 A | * | 1/1994 | Schulz ....................... 294/106 |
| 5,286,228 A | * | 2/1994 | Lee et al. ..................... 446/26 |
| 5,328,224 A | * | 7/1994 | Jacobsen et al. ........... 294/104 |
| 5,378,033 A | | 1/1995 | Guo et al. |
| 5,501,498 A | * | 3/1996 | Ulrich ....................... 294/106 |
| 5,538,089 A | * | 7/1996 | Sanford ........................ 173/2 |
| 5,568,849 A | * | 10/1996 | Sasaki et al. ................ 192/34 |
| 5,732,595 A | * | 3/1998 | Brookins ...................... 74/374 |
| 5,762,390 A | | 6/1998 | Gosselin et al. |
| 5,988,026 A | * | 11/1999 | Reckelhoff et al. .......... 81/434 |
| 6,244,644 B1 | * | 6/2001 | Lovchik et al. ............ 294/111 |
| 6,505,870 B1 | * | 1/2003 | Laliberte et al. ........... 294/106 |

OTHER PUBLICATIONS

Guo, G., Qian, X., Gruver, W.A., "A Single–DOF Multi–Function Prosthetic Hand Mechanism with an Automatically Variable Speed Transmission," published in the proceedings of the ASME Mechanism Conference, Phoenix, vol. DE–45, pp. 149–154, 1992.

Rakik, M., "Multi–Fingered Robot Hand with Self–Adaptability," published in Robotics and Computer–Integrated Manufacturing, vol. 5, No. 2–3, pp. 269–276, 1989.

* cited by examiner

*Primary Examiner*—Victor Batson
(74) *Attorney, Agent, or Firm*—Ogilvy Renault James Angelhart

(57) ABSTRACT

A power switching mechanism for selectively connecting a robotic system having two-degrees-of-freedom power input to a robot tool having a plurality of actuators. The two-degrees-of-freedom power input comprises a translation power input and a power shaft rotation input. The switching mechanism comprises an axially displaceable connector mounted to the power shaft rotation input for rotating therewith. An indexing mechanism is connected to the power shaft rotation input and is axially movable sequentially between a neutral position and an actuator engaging position for each actuator. The axially displaceable connector engages any one of the actuators in response to movement of the axial translation of the two-degrees-of-freedom power input.

8 Claims, 4 Drawing Sheets

POWER SWITCHING MECHANISM FOR ROBOTIC APPLICATIONS

CROSS REFERENCE TO RELATED APPLICATION

This application is a Continuation in Part of patent application Ser. No. 09/579,493, dated May 30, 2000, now U.S. Pat. No. 6,505,870 by Applicants, the subject matter of which is incorporated herewith by reference.

TECHNICAL FIELD

The present invention relates to a power switching mechanism for use in robotic applications and, more specifically, for selectively connecting a robotic system to a robot tool.

BACKGROUND OF THE INVENTION

Many different types and forms of gripping mechanisms are known, providing a variety of functions and uses. Some gripping mechanisms are designed for specific tasks, they are simple, robust, easy to manufacture and lead to simple control schemes. However, they are not flexible and a new gripping mechanism must be designed for each given task. These gripping mechanisms have only a few degrees of freedom and are widely used in industry. Other gripping mechanisms are more flexible and can perform several different tasks. However, they are difficult to manufacture, lead to complex control schemes, include several actuators and can provide only small gripping forces. These gripping mechanisms have several degrees of freedom.

Finally, other gripping mechanisms have an architecture which combines the latter two cases, taking advantage of both through the concept of underactuation. Their design is based on a large number of degrees of freedom but with a reduced number of actuators. Indeed, underactuated gripping mechanisms are defined as those which have fewer actuators than the degree of freedom. This leads to flexible gripping mechanisms without the complexity associated with a large number of actuators.

Underactuation can be achieved using different structural mechanisms. A typical example is described in the Applicants' U.S. Pat. No. 5,762,390, issued on Jun. 9, 1998. A mechanical gripper, described in this patent, has three fingers and three phalanges per finger. The three pivotable phalanges are actuated by one actuator in a flexible and versatile gripping action of three degrees of freedom. The fingers are robust and can provide large gripping forces and perform power grasps and pinch grasps. An additional mechanism is provided to maintain the last phalanx orthogonal to the palm in order to allow the gripper to perform pinch grasps on objects of different sizes. The mechanical gripper including the limited number of actuators permits the fingers to bend independently so that, by actuating some of the actuators and not actuating others, different co-operative bending relationships are achieved.

In addition to the underactuation between the phalanges of a finger, it is also possible to obtain underactuation between the fingers of a gripping mechanism. This will further decrease the number of actuators while maintaining the same number of degree of freedom. This principle has been disclosed for the actuation of many fingers, for example, in U.S. Pat. No. 5,378,033 to Guo et al. and in the literature, see, for example, the article by G. Guo, X. Qian and W. A. Gruver, "A SINGLE-DOF MULTI-FUNCTION PROSTHETIC HAND MECHANISM WITH AN AUTOMATICALLY VARIABLE SPEED TRANSMISSION", published in the proceedings of the ASME mechanism conference, Phoenix, Vol. DE-45, pp. 149–154, 1992, and the article by M. Rakik entitled "MULTI-FINGERED ROBOT HAND WITH SELF-ADAPTABILITY", published in Robotics and Computer-Integrated Manufacturing, Vol. 5, No.2–3, pp. 269–276, 1989. In these references, each of the fingers has only one degree of freedom, i.e., the motion of the phalanges is coupled. The combination of the underactuation of the phalanges of a finger and the fingers of a hand is disclosed in the Applicant's United States Patent. The underactuation between the fingers is performed with the help of a one-input/multi-output differential. The concept of this differential has been introduced in the Applicant's United States Patent using a lever for two outputs.

It is also possible to orient the fingers with respect to one another (i.e., motion about an axis perpendicular to the palm of the gripping mechanism) with only one actuator by coupling their orientation. This is possible through the use of four-bar mechanisms that connect the base of the fingers. This decreases the number of degrees of the actuation and freedom of the system. This type of coupling has already been suggested in the Applicant's United States Patent and is provided by gears in U.S. Pat. No. 3,901,547 to Skinner II, and by grooves in the Guo et al. patent.

In order to achieve this underactuation between the fingers in a differential gripping mechanism, the force of the actuator is to be distributed between the fingers. If a finger grasps an object, the actuator will continue its motion and the other fingers will continue to close with the help of the differential mechanism. Nevertheless, this principle associated with a differential mechanism sometimes limits the performance of the gripping mechanism especially in pinch grasps. It may be desirable, for example, to use only two fingers to perform a pinch grasp and prevent the remainder of the fingers from closing which may potentially disturb the grasp. This is not a problem with a gripping mechanism having multiple actuators because each finger is controllably actuated independently.

Therefore, there exists a need for improved gripping mechanisms which are underactuated between fingers using differential mechanisms and adapted to deactivate predetermined fingers in a closing action when it is desired.

It is also desirable to self-lock the fingers when a gripping mechanism grasps an object. It is especially important when a differential mechanism is used for underactuation between the fingers. An external force acting on one of the fingers may cause a displacement not only of the finger receiving the force but also of the remainder of the fingers because all the fingers are associated with the differential mechanism. A lever differential mechanism as described in the prior art is not able to provide the finger self-locking function. Therefore, there exists a need for an actuation system for gripping mechanisms underactuated between fingers, which provides a finger self-locking function.

SUMMARY OF THE INVENTION

It is an object of the present invention to provide a power switching mechanism for connecting a robot system having plural degrees of freedom to a robot tool having plural actuators.

Therefore, in accordance with the present invention, there is provided a power switching mechanism for selectively connecting a robotic system having a two-degrees-of-freedom power input to a robot tool having a plurality of actuators, with said two-degrees-of-freedom power input comprising a translation power input and a power shaft rotation input, said switching mechanism comprising:

an axially displaceable connector mounted to said power shaft rotation input for rotating therewith;

an indexing mechanism connected to said power shaft rotation input and axially movable sequentially between a neutral position and an actuator engaging position for each said actuator;

wherein the axially displaceable connector engages any one of said actuators in response to movement of the axial translation of the two-degree of freedom power input.

BRIEF DESCRIPTION OF THE DRAWINGS

Figure 1:
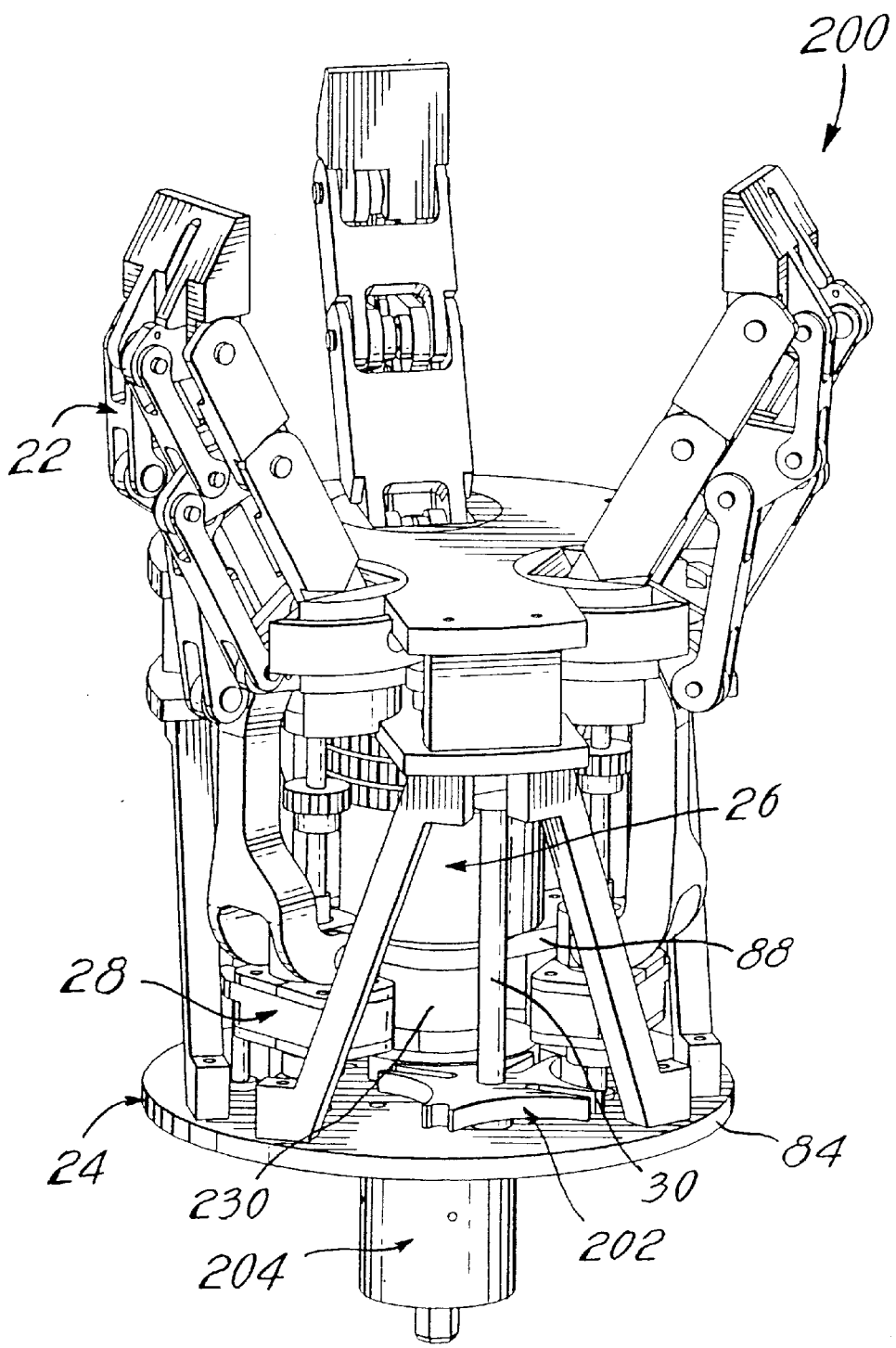
Figure 2:
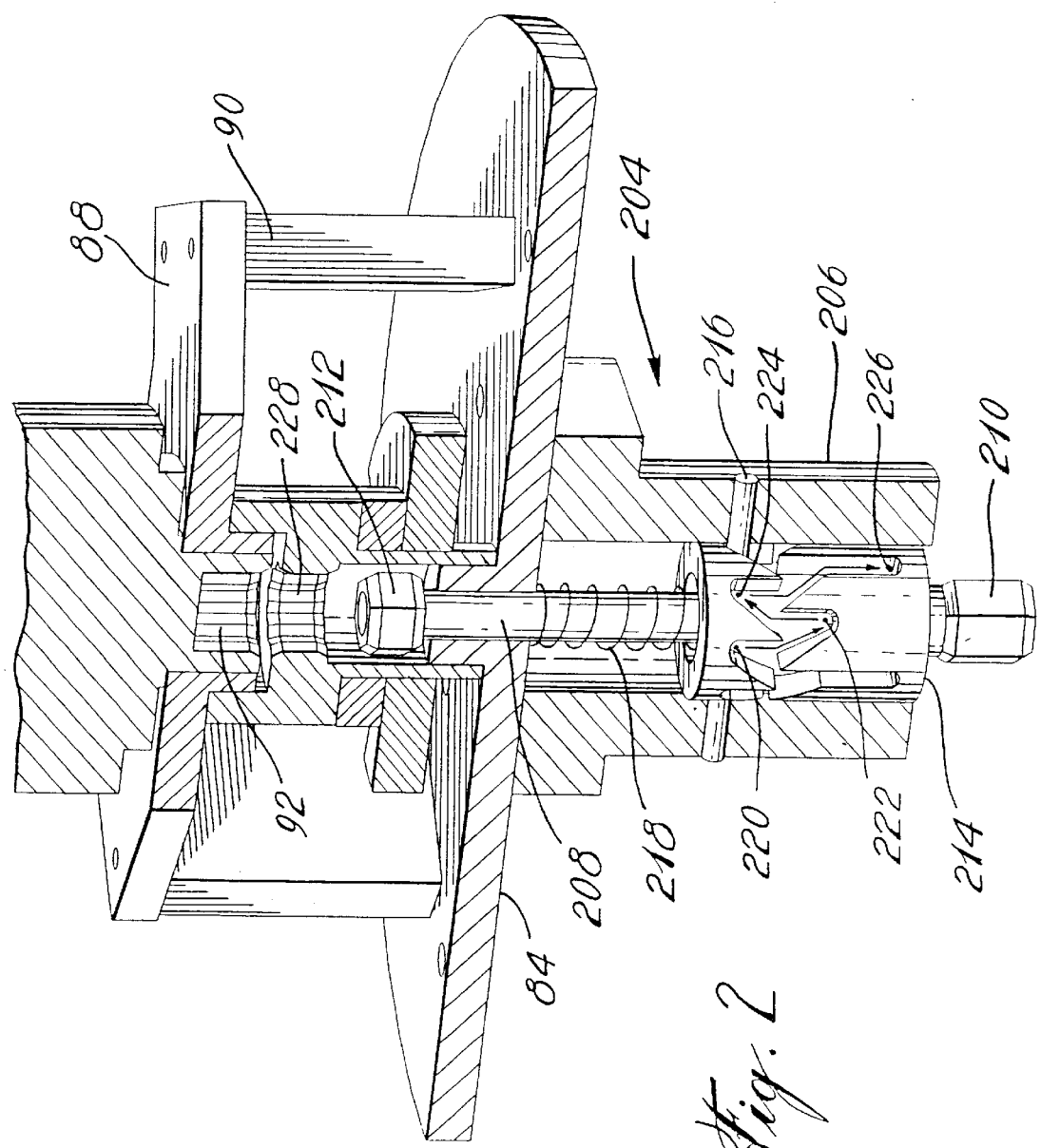
Figure 3:
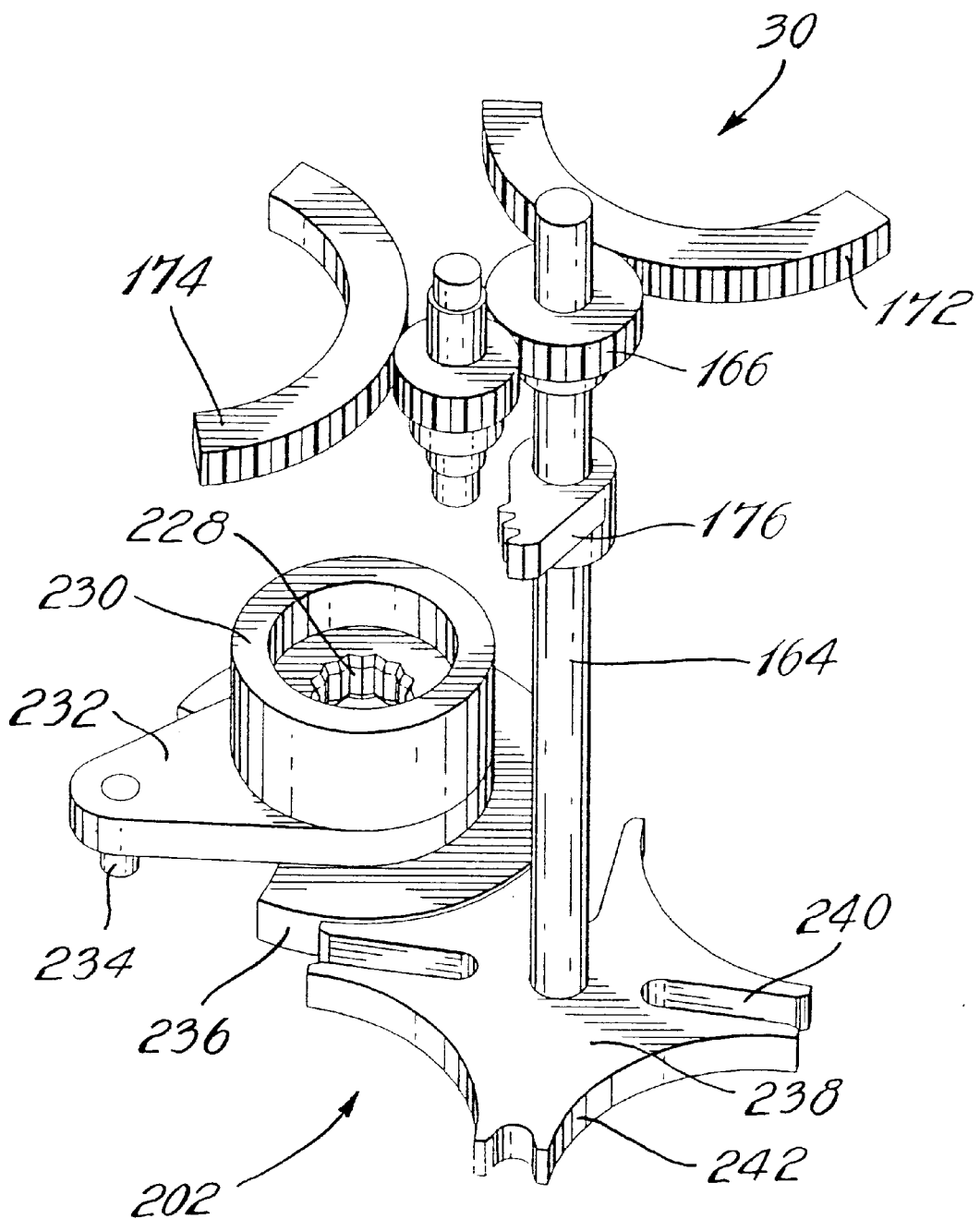
Figure 4:
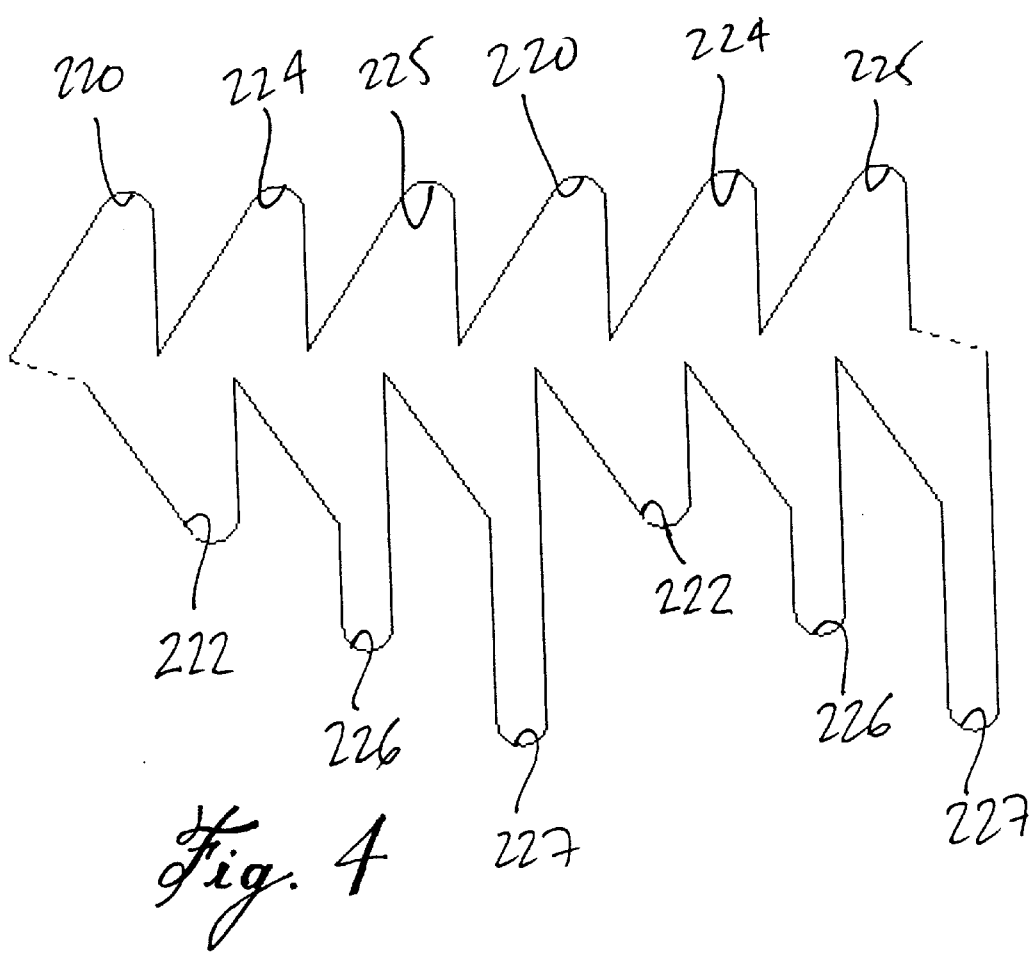

Having thus described the general nature of the present invention, reference will now be made to the preferred embodiments of the invention by way of examples and the accompanying drawings, in which:

FIG. 1 is a perspective view of the gripping mechanism incorporating another embodiment of the invention, which is a passive tool without actuators;

FIG. 2 is a partially sectional perspective view of the embodiment in FIG. 1, showing a switching mechanism used for selectively coupling the passive tool with an external driving apparatus;

FIG. 3 is a perspective view of a Geneva mechanism connected to the orienting mechanism and used in the embodiment in FIG. 1; and FIG. 4 is a schematic view of an unwrapped pattern for an indexing ring of the switching mechanism.

DETAILED DESCRIPTION OF THE PREFERRED EMBODIMENT

In a preferred embodiment as shown in FIGS. 1 and 2, a gripping mechanism is a passive tool generally shown at 200 and is adapted to be attached and actuated by an external apparatus (not shown). This apparatus can rotate and advance a socket that operates the passive tool, i.e., the gripping mechanism. Therefore, the two motors and the mechanisms that typically drive a differential 26 and an orientation transmission 30 are replaced by an interface, which comprise a power switching mechanism 204 and a Geneva mechanism 202.

The external driving apparatus generally includes a socket that is able to rotate and advance. Therefore, two degrees of actuation are available. The rotation of the socket can provide a large torque and power, and can rotate in both directions. The advance of the socket provides a smaller force and it is compliant.

In FIG. 2, the opening/closing and orientation of the fingers of the gripping mechanism are performed by the socket torque. The switching of the power of the socket torque from the open orientation and vice versa is performed by the socket advance with the help of an indexing mechanism. The power of the socket torque is transmitted to a shaft 208 via a male connector 210 which engages the socket of the external driving apparatus (not shown). The power of the shaft 208 is transmitted to the socket 92 or the socket 228 through a male connector 212. The shaft 208 is free to rotate and translate in the hole of the plate 84. An indexing ring 214 is free to rotate but fixed in translation on the shaft 208. Indexing pins 216 are attached to a housing 206 of the switching mechanism 204 and are inserted in the grooves of the indexing ring 214. A compression spring 218 is inserted on the shaft 208, between the plate 84 and a shoulder (not shown) on the shaft 208. The indexing mechanism works as follows. The compression spring 218 pushes to keep the shaft 208 towards the bottom position in which the indexing ring 214 is also towards the bottom position, and the indexing pins 216, are inserted in the grooves of the indexing ring 214 at positions 220. The motion of the indexing ring 214 is guided by the indexing pins 216 via the grooves in the indexing ring 214. When the driving apparatus socket pushes on the shaft 208 via the male connector 210, the shaft 208 advances against spring 218. This advance is stopped by the indexing pins 216 that are at position 222 in the grooves of the indexing ring 214. At position 222, the male connector 212 is inserted in socket 228. Then, if the driving apparatus socket torque is activated, the Geneva mechanism 202, therefore, the orienting mechanism 30 (see FIG. 3) will be activated. If the driving apparatus socket releases its pushing action, the compression spring 218 will push the shaft 208 towards the bottom position until the indexing pins 216 are at position 224 in the grooves of the indexing ring 214. As best illustrated in FIG. 2, the male connector 212 is in a neutral position when the indexing pins are in the slots 220 or 224. If the driving apparatus socket pushes again on the shaft 208 via the male connector 210, the shaft 208 advances against spring 218. This advance is stopped by the indexing pins 216 that are at position 226 in the grooves of the indexing ring 214. At position 226, the male connector 212 is inserted in the socket 92. Then, if the driving apparatus socket torque is activated, the opening and closing mechanism which is the differential 26 of the gripping mechanism is activated. If the driving apparatus socket releases its pushing action, the spring 218 will push the shaft 208 towards its bottom position until the indexing pins 216 are at position 220 in the grooves of the indexing ring to close the cycle. To switch between the two tasks, this cycle is infinitely repeated. The sockets 92 and 228 and the male connector 212 are machined for easy insertion.

A Geneva mechanism 202, as shown in FIG. 3, is used to drive an orientation shaft 164 in order to obtain predetermined self-locked orientations of the fingers of the gripping mechanism 20. The shaft 230, the driver 232, the pin 234 and the locking disc 236 are attached to form the input portion. The shaft 230 is pivotally attached by its ends to the plate 84 and 88 (see FIG. 1). The input is provided via the socket 228 of the shaft 230. When the Geneva mechanism 202 is in a moving phase, the pin 234 of the driver 232 is in one of four slots 240 of a Geneva wheel 238. During this phase, the driver 232 moves the Geneva wheel 238 by 90 degrees. When the Geneva mechanism 202 is in a dwell phase, the Geneva wheel 238 is locked by the locking disc 236, while the entire input portion of the Geneva mechanism 202 is free to rotate. During this phase, the fingers 22 are locked in their orientation.

In this preferred embodiment, the fingers are oriented in four predetermined positions, separated by thirty degrees each. Therefore, the ratio between either one of the finger gears 172 and 174 and the input gear 166 is 3:1, so that the predetermined positions of the two rotatable fingers are zero degrees, thirty degrees, 60 degrees and 90 degrees. To restrain the orientation of the fingers in these four positions, one of the slots 240 of the Geneva wheel 238 is filled to stop the rotation of the Geneva wheel 238 and the orientation shaft 164. This mechanism allows self-locking of the fingers even if they are not driven, allows positioning errors of the driver 232, and allows free motion of the driver 232 during the dwell phase, which is useful for the switching mechanism 204.

The power switching mechanism 204 illustrated in FIGS. 1 and 2 provides three output positions to its male connector 212, which are used by the gripping mechanism 200 as a neutral position, a position for actuating the orienting mechanism 30, and a position for actuating the opening/closing mechanism. It is pointed out that the male connector 212 is not required to have a neutral position.

Variation may be made without changes in the features presented in this embodiment. The power of the socket torque, for example, could come from an internal motor and the socket advance and switching mechanism could be replaced by an internal solenoid. Therefore, a gripping mechanism internally powered by a main motor and a solenoid is obtained. Although the passive tool 200 illustrated is a gripping mechanism, it is obvious that it may be any of a plurality of robotic tools for various purposes. For instance, the power switching mechanism 204 may be used in combination with different motorized tools to form an end effector. The tools could be a screwdriver with different heads, grippers for various objects, drills, saws, etc. The power switching mechanism 204 may transmit the input torque to one of the tools.

It has also been thought to use the power switching mechanism 204 with a manipulator with N degrees of freedom, which could have an input torque transmitted to one of the N joints by the power switching mechanism 204, for instance, an X-Y-Z positioning table with three axes to be driven one at a time, wherein the power switching mechanism could transmit the input torque to one of the three axes. In these cases, the manipulator would be intended for use in applications where speed of execution is not critical, since the joints would be activated one at a time.

Other examples of applications for the power switching mechanism 204 are a knob turning device and a multi-ratio gearbox. The knob turning device could consist of a grasping unit for grasping the knob and a turning unit for turning it. In the multi-ratio gearbox application, the gearbox could have many inputs and one output. Depending on the chosen input, the output would have a different ratio. The power switching mechanism 204 could transmit the input torque to one of the inputs of the gearbox.

The above-described power switching mechanism 204 with two outputs (considering that the neutral position is not used as an output position) can be generalized for multiple outputs. In the two-output version described above, the grooves 222 and 226 of the indexing ring 214 allow two different activated positions. Additional grooves with different lengths may allow more activated positions, provided that the passive tool receiving the outputs from the power switching mechanism 204 has corresponding additional sockets adapted for receiving the male connector 212.

Referring to FIG. 4, an unwrapped groove pattern having three output positions and a neutral position is shown as could be applied to the indexing ring 214. Grooves 222 and 226 each pair up for receiving the indexing pins 216 in the first and second output positions, and grooves 227 pair up for the third output position, whereas grooves 220, 224 and 225 define the neutral position. Different sequences of activated positions can be generated, such as the sequence of the pattern of FIG. 4: position 1, neutral, position 2, neutral, position 3, neutral, position 1, neutral, etc.

Changes and modifications to the above-described embodiments of the invention may be made without departing from the spirit or scope of the invention, which are intended to be limited solely by the scope of the appended claims.

We claim:

1. A power switching mechanism for selectively connecting a robotic system having a two-degrees-of-freedom power input to a robot tool having at least two actuators, with said two-degrees-of-freedom power input comprising a translation power input and a power shaft rotation input, said power switching mechanism comprising:
   an axially displaceable connector mounted to said power shaft rotation input for rotating therewith;
   an indexing mechanism connected to said two-degrees-of-freedom power input and having at least three abutment positions engageable sequentially in a reciprocal movement of the translation power input such that the indexing mechanism is axially movable sequentially between a neutral position and an actuator engaging position for each said actuator, with the neutral position and the actuator engaging positions each associated with a respective one of the abutment positions;
   wherein the axially displaceable connector engages any one of said actuators as a function of the abutment positions of the indexing mechanism.

2. The power switching mechanism as claimed in claim 1, wherein a number of said actuators is two, said indexing mechanism is axially movable between said neutral position, a first actuator input engaging position, said neutral position and a second actuator input engaging position.

3. The power switching mechanism as claimed in claim 1, wherein the robot tool is a gripping mechanism having at least three fingers, at least two of which are rotatably mounted for orientation on a palm.

4. The power switching mechanism as claimed in claim 3, wherein said gripping mechanism has a differential mechanism operatively connected to finger actuation mechanisms each causing one of said fingers to open and close, for receiving a grasp power input and transmitting the one power input into a plurality of power outputs to actuate the fingers in a close/open action, and an orienting mechanism operatively connected to the rotatable fingers for receiving one orientation input and transmitting the one input into at least two rotation outputs to rotate the at least two rotatable fingers in a finger orientation, wherein said grasp power input and said orientation input are derived from said power shaft rotation input.

5. The power switching mechanism as claimed in claim 4, wherein said indexing mechanism is axially movable sequentially between said neutral position, a grasp power input engaging position, said neutral position and an orientation input engaging position.

6. The power switching mechanism as claimed in claim 5, wherein said fingers have at least three degrees of freedom and said actuation mechanism differentially drives each degree of freedom of said finger.

7. A gripping mechanism comprising:
   at least three fingers, at least two of which are rotatably mounted for orientation on a palm;
   an actuation mechanism causing each of said fingers to open and close;
   a differential mechanism operatively connected to the respective finger actuation mechanisms for receiving a grasp power input and transmitting the one power input into a plurality of power outputs to actuate the respective fingers in a close/open action;
   an orienting mechanism operatively connected to the respective rotatable fingers for receiving one orientation input and transmitting the one input into at least two rotation outputs to rotate the respective at least two rotatable fingers in a finger orientation;
   a two-degrees-of-freedom power input receiving mechanical actuation power external to said gripping mechanism and having a rotation power input and a translation power input; and a switching mechanism having an axially displaceable connector mounted to said rotation power input for rotating therewith, and an indexing mechanism connected to said rotation power input and axially movable between engaging positions for said grasp power input and said orientation input, wherein the axially displaceable connector selectively engages any one of the grasp power input and the orientation input in response to movement of the translation power input for transmitting the rotation power input.

8. The gripping mechanism as claimed in claim 7, wherein said fingers have at least three degrees of freedom and said actuation mechanism differentially drives each degree of freedom of said finger.

* * * * *